United States Patent
Van Den Heuvel et al.

(10) Patent No.: US 7,961,979 B2
(45) Date of Patent: Jun. 14, 2011

(54) METHOD AND SYSTEM FOR PRODUCING AN IMAGE FROM A VEHICLE

(75) Inventors: Franciscus Antonius Van Den Heuvel, Delft (NL); Bart Johannes Beers, Rumpt (NL); Rudolf Gerrit Verwaal, Gouda (NL)

(73) Assignee: CycloMedia Technology B.V., Waardenburg (NL)

( * ) Notice: Subject to any disclaimer, the term of this patent is extended or adjusted under 35 U.S.C. 154(b) by 935 days.

(21) Appl. No.: 11/859,538

(22) Filed: Sep. 21, 2007

(65) Prior Publication Data
US 2008/0075391 A1 Mar. 27, 2008

(30) Foreign Application Priority Data

Sep. 22, 2006 (EP) .................................... 06019920

(51) Int. Cl.
*G06K 9/36* (2006.01)
(52) U.S. Cl. ....................... 382/284; 382/104
(58) Field of Classification Search .......... 382/103–105, 382/282–285
See application file for complete search history.

(56) References Cited

U.S. PATENT DOCUMENTS

| 5,815,161 | A  | * | 9/1998 | Emmerink et al. | 345/440 |
| 6,331,869 | B1 | * | 12/2001 | Furlan et al. | 348/36 |
| 6,563,960 | B1 |   | 5/2003 | Chan et al. | |
| 6,810,152 | B2 | * | 10/2004 | Endo et al. | 382/284 |
| 7,126,630 | B1 | * | 10/2006 | Lee et al. | 348/218.1 |
| 2002/0090143 | A1 | | 7/2002 | Endo et al. | |

FOREIGN PATENT DOCUMENTS

| DE | 10303015 A1 | 8/2004 |
| WO | 0188838 A1 | 11/2001 |

OTHER PUBLICATIONS

European Search Report for EP Application No. 06 01 9920 dated Feb. 14, 2007.

* cited by examiner

*Primary Examiner* — Wesley Tucker
(74) *Attorney, Agent, or Firm* — Hovey Williams LLP

(57) ABSTRACT

Method for producing an image from a vehicle, comprising the steps of: mounting a first camera on the vehicle, the first camera having a field of view; mounting a second camera on the vehicle and on a predetermined position relative to the first camera, the second camera having a field of view; acquiring a first image with the first camera; acquiring a second image with the second camera after the first image has been acquired when the position of the second camera is sufficiently close to or even coincides with the position from which the first image was taken, whereby the field of view of the second camera partially overlaps the field of view of the first camera when the first image was taken; and generating an image by stitching the first image and the second image together.

20 Claims, 4 Drawing Sheets

METHOD AND SYSTEM FOR PRODUCING AN IMAGE FROM A VEHICLE

CROSS-REFERENCE TO RELATED APPLICATIONS

The present non-provisional application claims priority benefit to EP 06 019 920.5, filed Sep. 22, 2006.

BACKGROUND OF THE INVENTION

1. Field of the Invention

The present invention relates to a method and a system for producing an image from a vehicle and a vehicle comprising such a system.

2. Description of the Related Art

Omnidirectional images are being used in for example the real estate market, infrastructural planning, investigation of local traffic situations, etc. Organizations such as governments, municipal authorities, real estate agents, and insurance companies make use of omnidirectional images to investigate outdoor situations from behind their desks.

Conventional methods for generating omnidirectional images from a vehicle include specialized omnidirectional cameras; shooting several images in different directions from a single view point and stitching all the images together; or shooting several images simultaneously by means of a plurality of cameras.

An advantage of using a specialized omnidirectional camera is that images are taken in a single shot, the shot containing a seamless representation of the surroundings of the location where the image was taken. No further processing is necessarily required. A disadvantage is the high cost of the equipment and the considerable amount of distortion of the image.

Generating an omnidirectional image from several images that are taken in different directions from a single point of view by a conventional camera is advantageous in that the costs of the system are relatively low. A serious disadvantage of this method is that several images have to be taken, which takes up considerably more time compared to when a single image is taken by an omnidirectional camera, while in the meantime the vehicle is not moving, possibly blocking traffic. Furthermore, care must be taken that the camera system is pivoted around the entrance pupil of the camera to reduce or eliminate parallax errors. A further disadvantage is the post processing required to stitch the images together to generate the final omnidirectional image.

In the last example where a plurality of cameras are used on top of a single vehicle, an advantage is that images can be taken while moving, so that a relatively high amount of images can be taken in a single time unit since stopping of the vehicle is not required. Multiple images are taken in a single shot by the plurality of cameras. Blocking of traffic is not an issue either. A disadvantage is that parallax errors due to the plurality of entrance pupils cannot be avoided, resulting in stitching errors during the post processing.

SUMMARY

An object of the present invention is to provide a method to generate images from a vehicle without introducing parallax errors or without a need to stop the vehicle during the acquisition of the images.

In an embodiment of the present invention a method is provided for producing an image from a vehicle, comprising the steps of: mounting a first camera on the vehicle, the first camera having a field of view; mounting a second camera on the vehicle and on a predetermined position relative to the first camera, the second camera having a field of view; acquiring a first image with the first camera; acquiring a second image with the second camera after the first image has been acquired when the position of the second camera is sufficiently close to or even coincides with the position from which the first image was taken, whereby the field of view of the second camera partially overlaps the field of view of the first camera when the first image was taken; generating an image by stitching the first image and the second image together. Although three or even more cameras may be used in embodiments of the present invention, it is preferable to use only two cameras. Two cameras with angles of view of slightly more than 180° can cover the entire horizon, so an omni-directional image can be created.

Techniques for image stitching are known in the field of digital imaging. Some stitching techniques are described in international patent application WO 0188838 and U.S. Pat. No. 6,563,960.

In a further embodiment of the present invention the first camera comprises a first entrance pupil and the second camera comprises a second entrance pupil, and the first entrance pupil and the second entrance pupil are located on a line that is substantially parallel to the predominant direction of the movement of the vehicle.

Although the cameras can face in any direction or combination of directions in embodiments of the present invention, as long as the fields of view of the cameras overlap at least partially, in a preferred embodiment the first camera faces substantially in the predominant direction of movement of the vehicle and the second camera faces substantially in the opposite direction that the first camera faces.

In a further preferred embodiment the first camera is positioned relatively forward of the second camera with regard to the predominant direction of movement of the vehicle.

In yet another embodiment of the present invention the position of the second camera is sufficiently close to the position from which the first image was taken if the entrance pupil of the second camera is within a predetermined distance from the position where the entrance pupil of the first camera was when the first image was taken.

In another embodiment of the present invention the predetermined distance amounts to 5 centimeters, although it is preferred that the predetermined distance amounts to 1 centimeter.

In another embodiment the position determining system comprises a satellite navigation system, generally known as a Global Navigation Satellite System (GNSS), including: the Global Positioning System (GPS), Glonass, and Galileo.

In another embodiment the distance traveled is measured by means of at least an inertial navigation system (INS). The inertial navigation system can additionally provide the relative orientation of the vehicle during acquisition of an image which aids the stitching process in that the amount of overlap is determined based on the relative orientation among the images which is dependent on the relative orientations of the vehicle when the images were acquired.

In another embodiment the present invention provides a system for generating an image from a vehicle, comprising: first imaging means to be mounted to the vehicle; second imaging means to be mounted on the vehicle on a predetermined position relative to the first imaging means; distance traveled measurement means for measuring the distance traveled by the vehicle; and control means connected to the first and second imaging means to control the acquiring of a first image by the first imaging means and a second image by the second imaging means and connected to the distance traveled measurement means to initiate the acquisition of the second image after the vehicle has traveled such that the position of the second imaging means is sufficiently close to the position of the first imaging means during the acquiring of the first image.

In a preferred embodiment the traveled distance measuring means comprise at least one odometer.

In a further preferred embodiment the vehicle comprises at least one non-driven wheel and the odometer is connected to the non-driven wheel. It is advantageous if the first and second camera are mounted as close as practical to the wheel with the odometer connected to it. Preferably odometers are connected to all non-driven wheels. In that case relative orientation information of the vehicle can be derived from the odometers.

In a further embodiment the present invention provides a vehicle with a system for generating an image from the vehicle, comprising: first imaging means to be mounted to the vehicle; second imaging means to be mounted on the vehicle on a predetermined position relative to the first imaging means; distance traveled measurement means for measuring the distance traveled by the vehicle; and control means connected to the first and second imaging means to control the acquiring of a first image by the first imaging means and a second image by the second imaging means and connected to the distance traveled measurement means to initiate the acquisition of the second image after the vehicle has traveled such that the position of the second imaging means is sufficiently close to the position of the first imaging means during the acquiring of the first image.

DESCRIPTION OF THE DRAWING FIGURES

Hereinafter the present invention will be described in detail with reference to the accompanying drawings, wherein.

DETAILED DESCRIPTION

Figure 1:
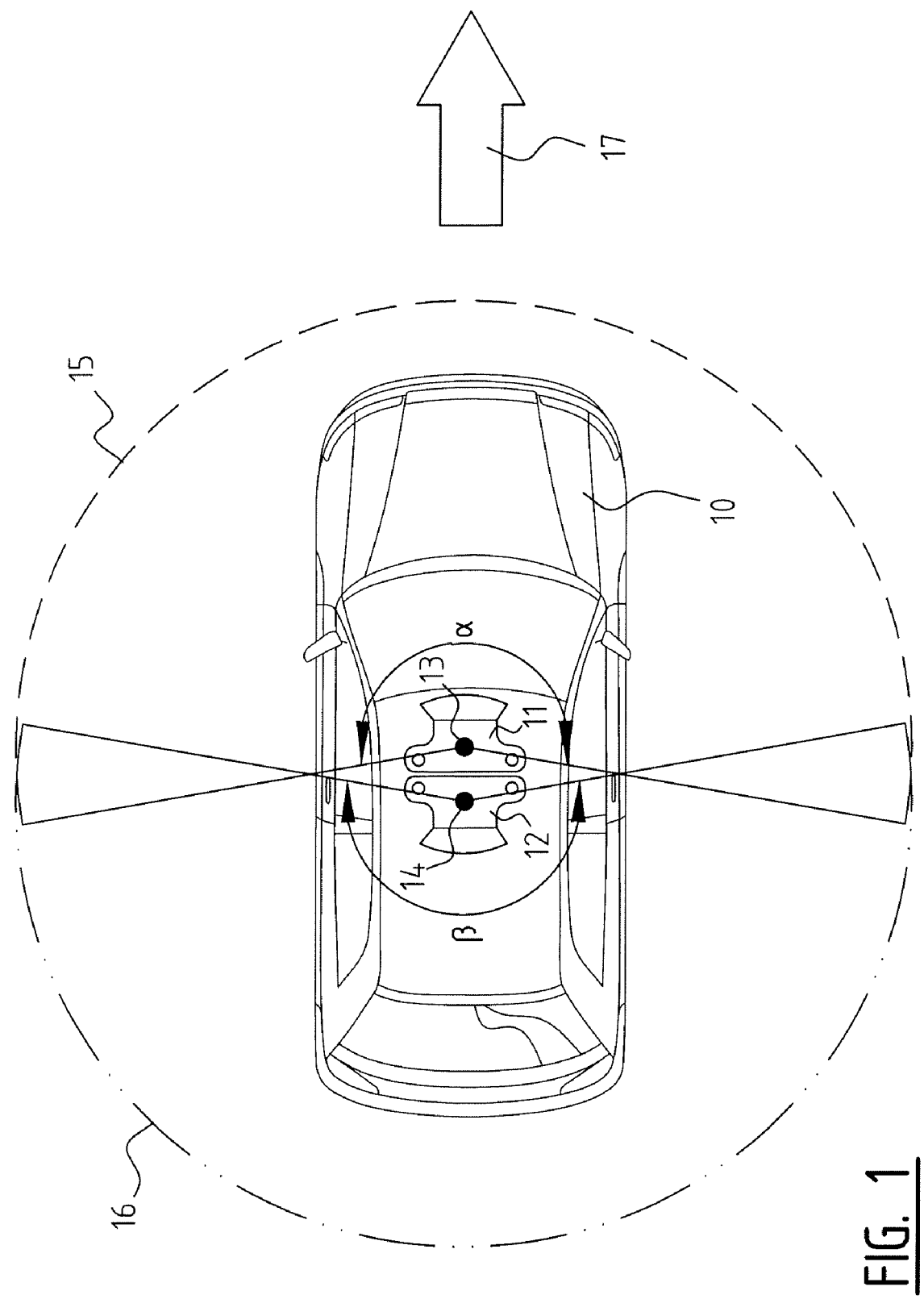
FIG. 1 is a schematic top view of a vehicle with two diametrically placed cameras located on top of the vehicle in accordance with the present invention.

A vehicle 10 (FIG. 1) moving in the direction of the arrow 17 is shown with two diametrically placed cameras 11 and 12 located on top of the vehicle. The first camera 11 is located in a position relatively forward of the second camera 12 with regard to the moving direction of the vehicle 10. The first camera is facing substantially in the moving direction of the vehicle 10. The second camera 12 located backwards of the first camera with regard to the moving direction of the vehicle 10 faces in substantially the opposite direction of the first camera 11. The first camera 11 has a viewing angle α. The second camera 12 has a viewing angle β. The sum of the viewing angles α and β are such that they exceed 360° so that some overlap in the fields of view allows for the two images to be stitched together. In this preferred embodiment the viewing angles α and β are about 185°, see the respective circle segments 15 and 16. In the figures the angles α and β have been exaggerated for viewing purposes. The centre of the circle segments is defined by the respective entrance pupils 13 and 14 of the lens systems of the respective cameras 11 and 12.

Figure 2:
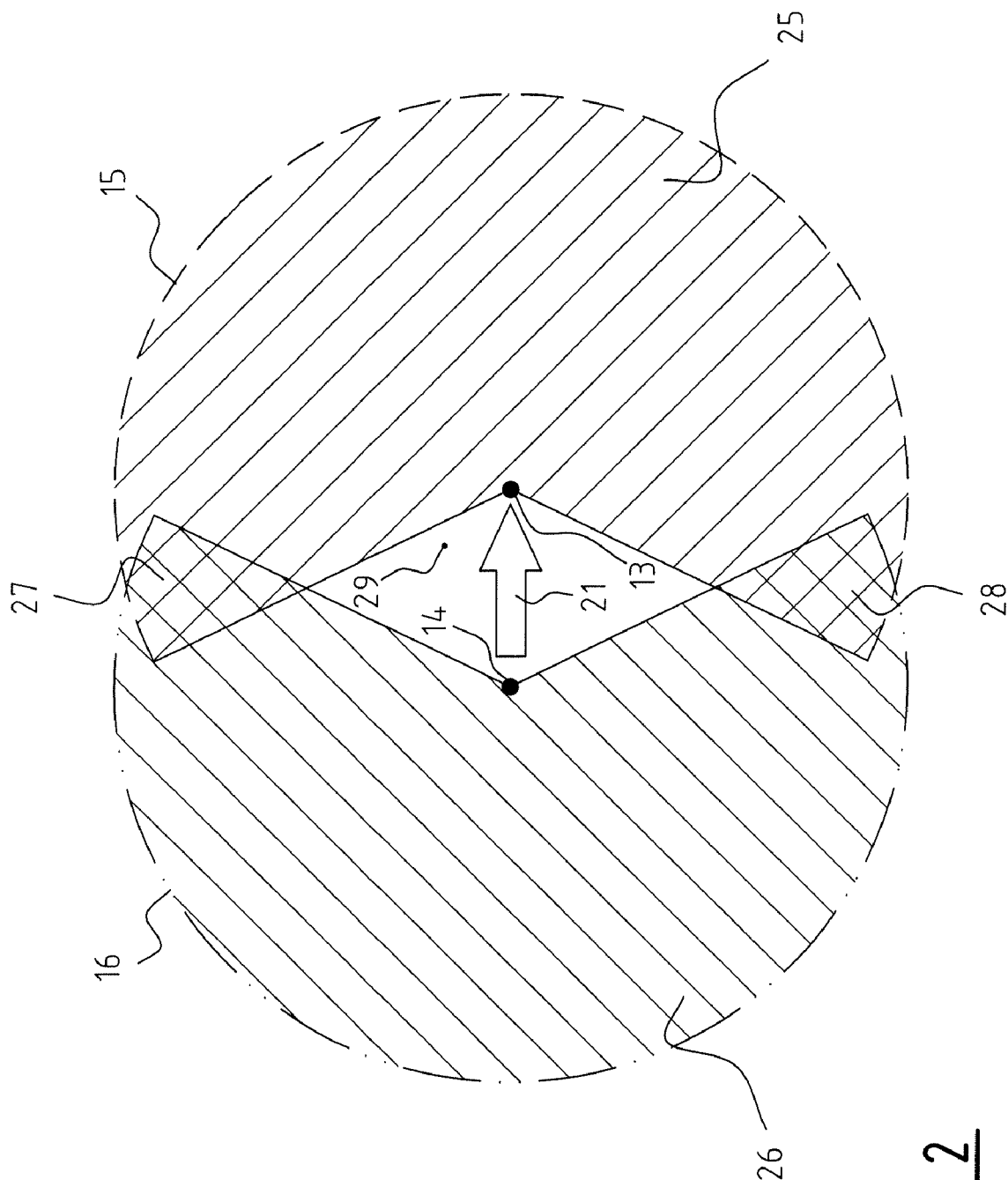
FIG. 2 is a schematic top view of the field of view of the two cameras of FIG. 1.

The fields of view 15 and 16 partially overlap in areas 27 and 28; see also FIG. 2. This overlap allows for the first image of the first camera 11 and the second image of the second camera 12 to be stitched together. In addition to the overlap areas 27 and 28, the field of view 15 further comprises an area 25 that is only covered by the first image of the first camera 11. In addition to the overlap area 27 and 28 the field of view 16 also comprises an area 26 that is only covered by the second image of the second camera 12. Area 29 is not covered by any of the two cameras. In order to inhibit or eliminate parallax errors in the overlap areas 27 and 28, the first image and second image are shot in such a way that the position of the entrance pupil 13 of the first camera 11 coincides as much as possible with the entrance pupil 14 of the second camera 12. The two entrance pupils 13 and 14 are made to coincide sufficiently by locating the entrance pupils in substantially the same position, but at different moments in time. This is realized by taking an image with the first camera 11 and then while the vehicle 10 moves further, waiting for the entrance pupil 14 of the second camera 12 to move to the position where the first entrance pupil 13 of the first camera 11 actually was when the first image was taken by the first camera 11. When the entrance pupil 14 of the second camera 12 has reached the original position of the first entrance pupil 13 of the first camera 11, the second image is taken by the second camera 12. This is denoted by the arrow 21. So in fact the entrance pupil 14 of the second image is virtually moved to the entrance pupil 13 of the first image, resulting in more or less coinciding entrance pupils.

Figure 3:
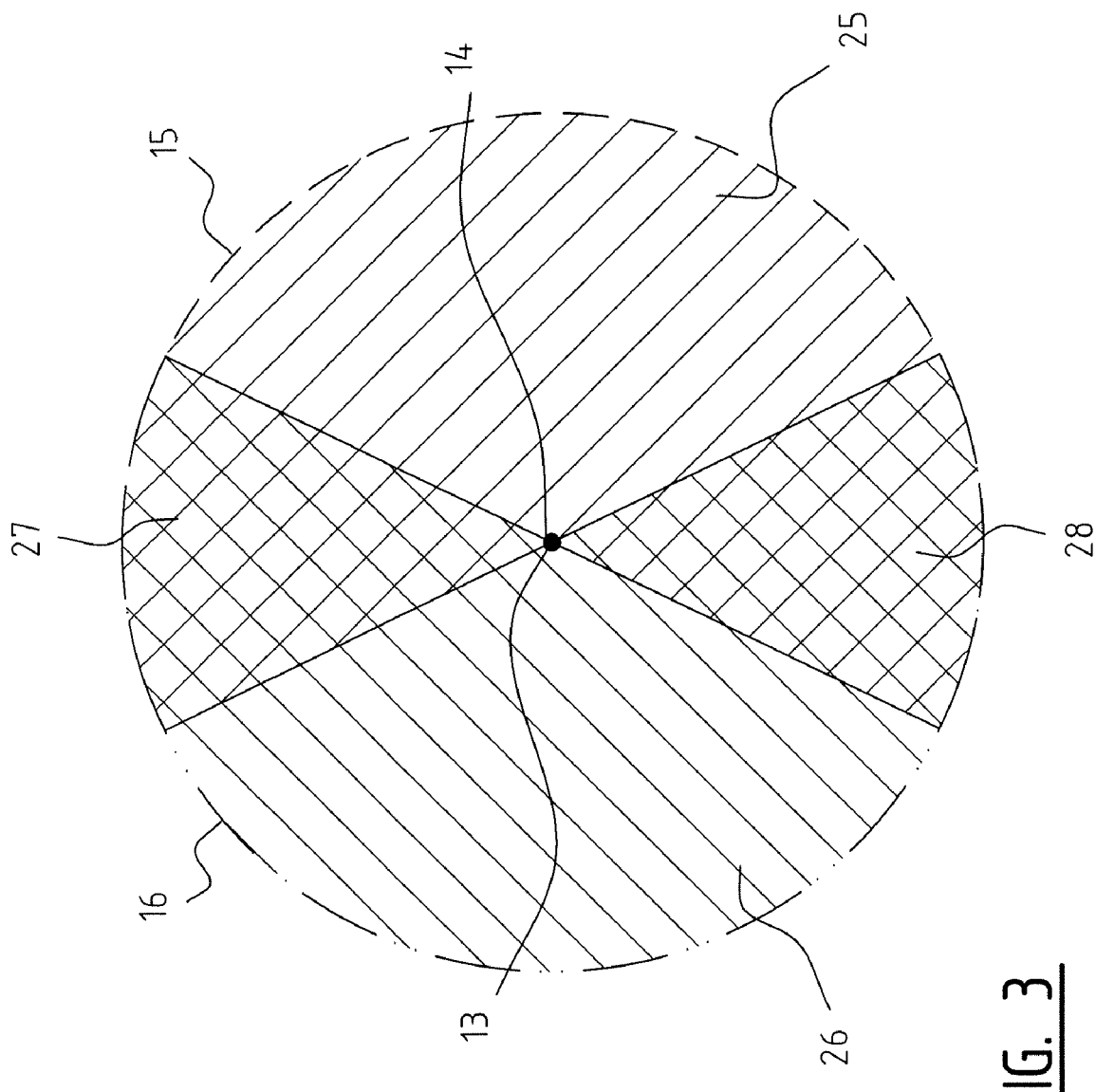
FIG. 3 is a schematic top view of the fields of view of the two cameras when the vehicle is moving and the present invention is applied.

When the entrance pupil 13 of the first camera 11 and the entrance pupil 14 of the second camera 12 actually coincide, see FIG. 3, the uncovered area 29 has disappeared and parallaxes have been eliminated.

If the optical axes of the lens systems of the first and second cameras 11, 12 do not coincide sufficiently, one of the overlap areas 27 or 28 might disappear resulting in a gap in the omnidirectional image. This happens for example when the vehicle takes a turn between taking the first image and the second image. The optical axes will turn with the vehicle causing the second image to be taken with an optical axis being directed differently from the optical axis of the first image. This causes the overlap area 27 or 28 at the outer side of the turn to show less overlap and the respective other overlap area 28 or 27 to become larger and subsequently causes one of the overlap areas in the stitching process to become smaller and the other overlap area to become larger. In fact the overlap area that has become smaller may become too small for containing information necessary to perform a proper stitch operation. It can be shown that with a distance between the entrance pupils 13, 14 of the first and second camera 11, 12 of 0.46 meter and the angle of view α, β of the two cameras being 185°, that the turning radius should be no smaller than 5.3 meters to ensure that the overlap area at the outer side of the turn is still existing.

Figure 4:
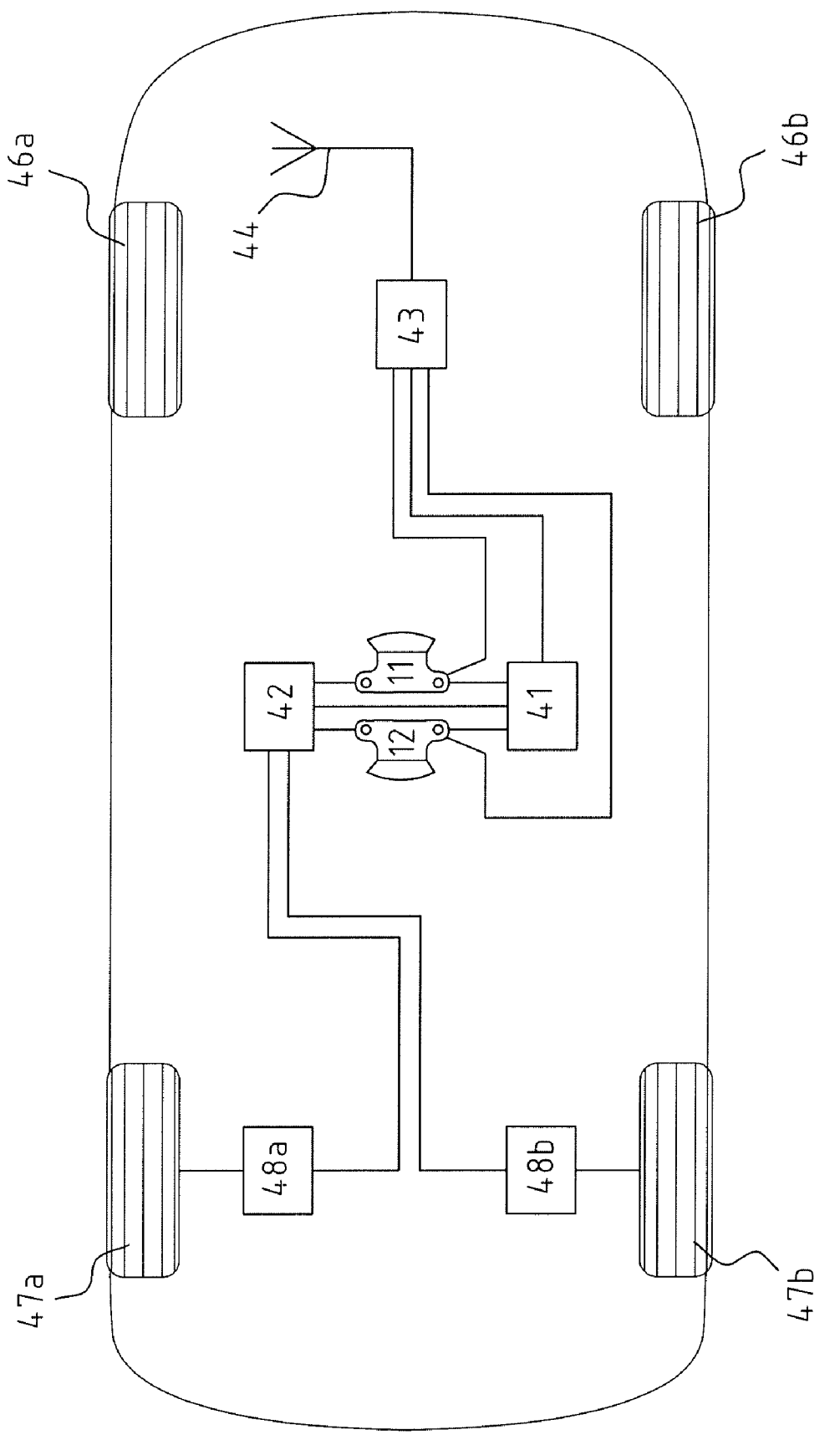
FIG. 4 is a diagram showing the system of the present invention.

The diagram of FIG. 4 shows a first camera 11, facing in a first direction and a second camera 12 facing in a second direction being opposite of the direction of the first camera. Odometers 48a and 48b are connected to wheels 47a and 47b. The odometers are connected to the non-driven wheels. The odometers 48a and 48b are connected to a camera control 42. Camera control means 42 control the first and second cameras 11 and 12, sending commands to the cameras when it determines that a first or a second image is to be taken. In the embodiment of FIG. 4, the vehicle is also equipped with a position determining system, in this embodiment with a GPS, comprising an antenna 44 to receive information from navigation satellites and the receiver 43 for detecting and decoding the received signals and calculating the present position of the vehicle. The receiver 43 provides a computing means 41 with position information. Based on the position information received from receiver 43 the computing means 41 determines when an omnidirectional image should be acquired. The computing means 41 is connected to the camera control 42 and sends a command to start the acquisition of the omnidirectional image. After receiving the command to acquire an image from the computing means 41 camera control 42 sends a command to the first camera 11 to start the acquisition of the first image in the first direction. In the meantime it starts monitoring the distance covered by the vehicle since the first image has been taken by the first camera 11 by monitoring the information supplied by the odometers 48a and 48b. When it is determined that the distance traveled since the first image has been acquired equals the distance between the entrance pupils 13, 14 of the first and second cameras 11, 12 it sends a command to the second camera 12 to acquire the second image in the second direction. In this embodiment the cameras 11 and 12 the images are sent over a connection to the computing means 41. The computing means 41 store the first and second images together with the position information received from the position determining system constituted by antenna 44 and receiver 43. Additionally the date and time the images where taken are stored. Next, the computing means 41 starts the stitching process to generate an omnidirectional image. In an alternative embodiment of the present invention the omnidirectional image is not generated on the vehicle itself, but the computing means 41 only stores the first and second image in order to be stitched together at a later stage preferably on a powerful non-mobile computing means external to the vehicle.

While embodiments of this invention are illustrated and disclosed, these embodiments should not be constrained to limit the claims. It is anticipated that various modifications and alternative designs may be made without departing from the scope of this invention.

The invention claimed is:

1. Method for producing an image from a vehicle (10), comprising the steps of:
   mounting a first camera (11) on the vehicle (10), the first camera having a field of view (15);
   mounting a second camera (12) on the vehicle (10) and on a predetermined position relative to the first camera (11), the second camera (12) having a field of view (16);
   acquiring a first image with the first camera (11);
   acquiring a second image with the second camera (12) after the first image has been acquired when a position of the second camera is proximate to or coincides with a position from which the first image was taken due to movement of the vehicle, whereby the field of view (16) of the second camera (12) partially overlaps the field of view (15) of the first camera (11) when the first image was taken; and
   generating an image by stitching the first image and the second image together.

2. Method according to claim 1, wherein the first camera (11) comprises a first entrance pupil (13) and the second camera (12) comprises a second entrance pupil (14) and wherein the first entrance pupil (13) and the entrance pupil (14) are located on a line that is substantially parallel to a predominant direction of the movement of the vehicle (10).

3. Method according to claim 2, wherein the first camera (11) faces substantially in the predominant direction of movement of the vehicle (10) and the second camera (12) faces substantially in an opposite direction that the first camera faces.

4. Method according to claim 2, wherein the first camera (11) is positioned relatively forward of the second camera (12) with regard to the predominant direction of movement of the vehicle (10).

5. Method according to claim 1, wherein the first and second cameras (11,12) each have an angle of view, and a sum of the angles of view of the first and second cameras (11,12) exceeds 360°.

6. Method according to claim 5, wherein the angle of view of at least one of the first and second cameras (11,12) is about 185°.

7. Method according to claim 2, wherein the position of the second camera (12) is proximate to the position from which the first image was taken when the entrance pupil (14) of the second camera (12) is within a predetermined distance from the position where the entrance pupil (13) of the first camera (11) was when the first image was taken.

8. Method according to claim 1, wherein a distance traveled is determined by at least one odometer (48a,48b).

9. Method according to claim 1, wherein a distance traveled is measured by at least a position determining system (43) comprising a satellite navigation system, such as a Global Positioning System (GPS).

10. Method according to claim 1, wherein a distance traveled is determined by means of a combination of a position determining system (43) and at least one odometer (48a,48b).

11. Method according to claim 1, wherein a distance traveled is measured by means of at least an inertial navigation system (INS).

12. Method according to claim 1, wherein orientation determining means determines an orientation of the vehicle when an image is acquired and using the orientation of the vehicle during the stitching process.

13. Method according to claim 1, further comprising the steps of:
   mounting at least one additional camera on the vehicle (10) on a predetermined position relative to the first camera (11), having a field of view; and
   acquiring an additional image with the additional camera when the position of the additional camera is proximate to or coincides with the position from which the first image was taken, whereby the field of view of the additional camera partially overlaps the field of view (15) of the first camera (11), the field of view (16) of the second camera (12), and the field of view of any further camera that acquired an image after the first camera (11) acquired the first image when the first image, the second image, or the further image was taken.

14. Method according to claim 13, wherein when there are two additional cameras, each camera covers an angle of view of at least approximately 90°.

15. Method according to claim 13, further including more than two additional cameras.

16. System for generating an image from a vehicle, comprising:
   first imaging means to be mounted to the vehicle (10);
   second imaging means mounted on the vehicle (10) on a predetermined position relative to the first imaging means;
   distance traveled measurement means for measuring a distance traveled by the vehicle (10); and
   control means (42) connected to the first and second imaging means to control the acquiring of a first image by the first imaging means and a second image by the second imaging means and connected to the distance traveled measurement means to initiate the acquisition of the second image after the vehicle (10) has traveled such that the position of the second imaging means is proximate to or coincides with the position of the first imaging means during the acquiring of the first image.

17. System according to claim 16, wherein the traveled distance measuring means comprise at least one odometer (48a,48b).

18. System according to claim 17, wherein the vehicle (10) comprises at least one non-driven wheel and the odometer (48a,48b) is connected to the non-driven wheel.

19. System according to claim 16, wherein the distance traveled measurement means comprises a position determining system (43) comprising a satellite navigation system.

20. System according to claim 16, wherein the traveled distance measuring means comprises a combination of a position determining system (43) and at least one odometer (48a, 48b).

* * * * *